Feb. 20, 1968  B. J. DAVISON  3,369,404
PERCENT RATE OF CHANGE PRESSURE SENSOR
Filed July 1, 1966
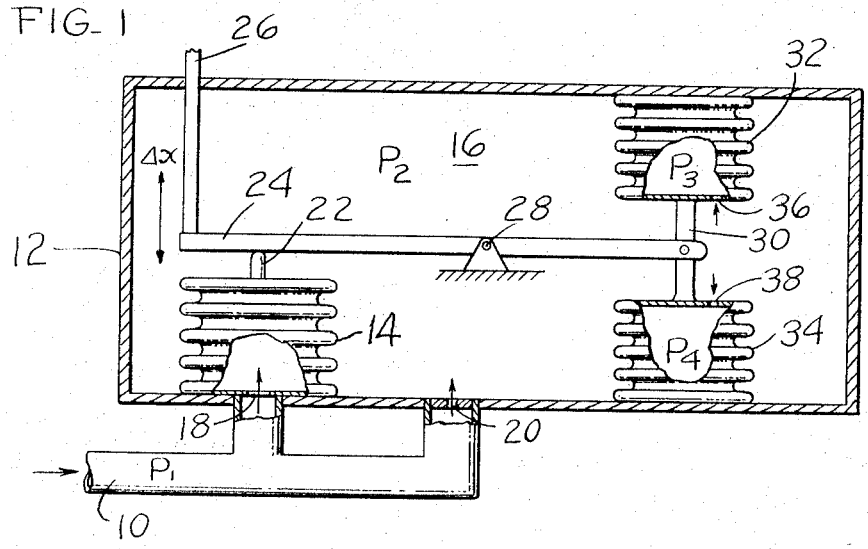
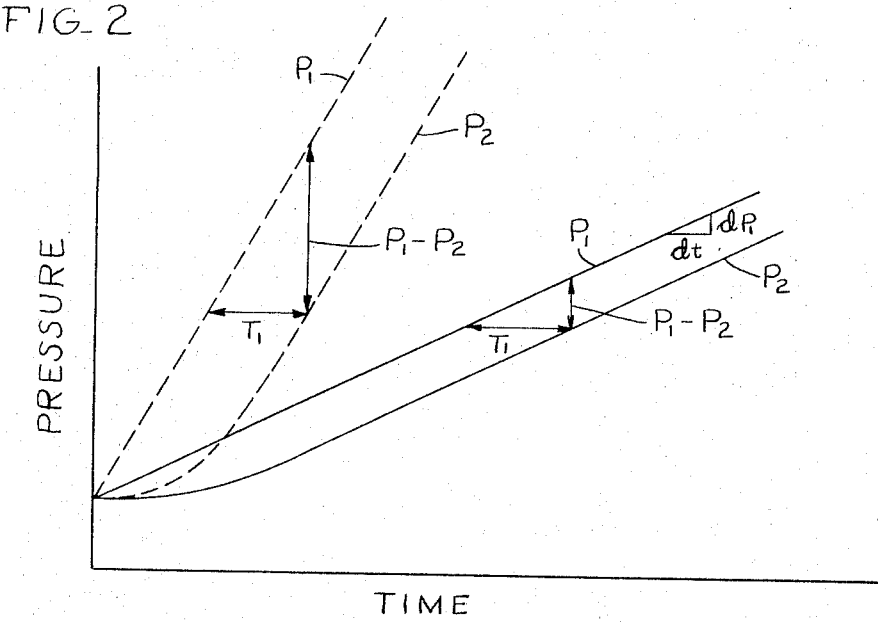
INVENTOR
B. J. DAVISON
BY Fishman & Van Kirk
ATTORNEYS

United States Patent Office 3,369,404
Patented Feb. 20, 1968

3,369,404
PERCENT RATE OF CHANGE
PRESSURE SENSOR
Bartholomew J. Davison, Windsor, Conn., assignor to
United Aircraft Corporation, East Hartford, Conn., a
corporation of Delaware
Filed July 1, 1966, Ser. No. 562,209
15 Claims. (Cl. 73—407)

This invention relates to a percent rate of change pressure sensor. More particularly, this invention relates to a percent rate of change pneumatic pressure sensor for use in high performance pneumatic systems.

In a typical control system utilizing pneumatic pressure sensing, a steady state absolute pressure or pressure ratio is the primary control signal. Disturbances in these control systems are usually exhibited as a percent rate of change of pressure. For example, percent rate of change of turbine discharge pressure is indicative of an afterburner light in a jet engine; percent rate of change of duct pressure is indicative of an airflow transient in the inlet of a supersonic jet engine. It is sometimes desirable to sense these disturbances and use the sensed signals to incorporate disturbance anticipation into the control system.

If rate of change of pressure only is used as the control parameter, the anticipation provided for a given disturbance would vary, dependent upon operating absolute pressure levels. For example, assume that a given disturbance yields a 20 percent change in pressure per second at any pressure level, and assume the nominal pressure band varies from 20 to 100 p.s.i.a. In the high pressure case the actual pressure change would be 5 times the pressure change in the low range. If the control system initiated corrective action based on changes in pressure, the corrective action would either be inadequate at the low pressure condition or excessive at the high pressure condition. To correct this problem it is desirable to sense percent rate of change of pressure.

Percent rate of change pressure sensing devices have been proposed to overcome the shortcomings of absolute pressure change sensing devices as discussed above. However, these prior devices have been two step devices in that they either obtained the rate of change in one operation and then divided to obtain the percent rate of change, or they obtained the percent change and then differentiated to get the rate of change.

In the present invention a bellows arrangement is employed in conjunction with a pivoted output lever to give a direct reading of the percent rate of change of a pressure. The fluid to be monitored is fed to the internal volume of a bellows mounted in a chamber. The fluid is also delivered to the interior of the chamber, and thus to the exterior surface of the bellows, via an orifice which is of predetermined smaller flow area than the orifice leading to the internal volume of the bellows. The bellows is thus caused to generate a signal proportional to the rate of change of the pressure to be monitored, and this signal is delivered to an output lever in the chamber. The output lever is also subjected to a countering force which is generated by pneumatic spring means in the chamber, the spring rate of the pneumatic spring being proportional to the pressure being monitored. The rate of change signal and the signal from the pneumatic spring means combine in the output lever to generate a displacement of the output lever as a function of the percent rate of change of the pressure to be monitored.

Accordingly, one object of the present invention is to produce a novel percent rate of change pressure sensor.

Another object of the present invention is to produce a novel percent rate of change pressure sensor in which a unit responsive to rate of change of pressure is combined with a pneumatic spring having a spring rate proportional to the pressure being monitored to generate an output commensurate with percent rate of change of the pressure to be monitored.

Still another object of the present invention is to produce a novel percent rate of change pressure sensor in which both rate of change and percent change are monitored and combined in a unitary structure.

Other objects and advantages will be apparent from the following detailed description and drawings.

In the drawings:

FIGURE 1 is an elevation view of an embodiment of the present invention.

FIGURE 2 is a graph showing a pressure-time relationship of interest with respect to the present invention.

Referring now to FIGURE 1, a conduit 10 leads from any desired pressure source to a casing 12. The source of pressure from which conduit 10 leads may be any source of variable pressure fluid which is to be monitored for control purposes. For example, conduit 10 may lead from an engine station in a gas turbine aircraft engine to provide a measure of the air pressure at that station. A bellows 14 is located in a closed chamber 16 formed by casing 12, and the interior of bellows 14 is connected to conduit 10 via a first orifice 18 in casing 12. Chamber 16 communicates with conduit 10 via a second orifice 20. It is a requirement of this invention that the effective flow area of orifice 18 be significantly larger than the effective flow area of orifice 20. For effective operation of this invention the ratio $$\frac{V_{16/A_{20}}}{V_{14/A_{18}}}$$

should be at least 10, where:

$V_{16}$=the volume of chamber 16
$A_{20}$=the effective area of orifice 20
$V_{14}$=the interior volume of bellows 14
$A_{18}$=the effective area of orifice 18

The pressure of the air in conduit 10 is labeled $P_1$, and the pressure of the air in chamber 16 is labeled $P_2$. It will be apparent that as long as the pressure $P_1$ in conduit 10 remains constant the pressure $P_2$ in chamber 16 will equal $P_1$. $P_1$ is, for all intents and purposes, the pressure at the station of interest. As $P_1$ changes, the change is transmitted via orifice 18 to the interior of bellows 14, and the pressure within bellows 14 changes accordingly so that the pressure within the interior of bellows 14 is essentially $P_1$ at all times. The change in $P_1$ is also transmitted via second orifice 20 to chamber 16. However, because of the relatively small flow area of orifice 20 and the large volume of chamber 16, the pressure $P_2$ in chamber 16 does not change immediately with changes in $P_1$. Rather, there is a distinct time lag between changes in $P_1$ and changes in $P_2$. The time lag between $P_1$ and $P_2$ is mainly a function of the area of orifice 20 and the volume of chamber 16; the time lag is essentially constant regardless of the changes in pressure, although the time lag might vary slightly for widely different pressure ranges. In this regard, reference is made to FIGURE 2, wherein it is graphically depicted that the time lag $T_1$ between $P_1$ and $P_2$ is essentially constant regardless of the rate of change of $P_1$.

Referring again to FIGURE 1, the interior volume of bellows 14 is loaded by pressure $P_1$, while the outer surface of bellows 14 is loaded by pressure $P_2$ in chamber 16. When $P_1$ and $P_2$ are equal, corresponding to a steady state condition for $P_1$, the forces across bellows 14 are equalized. However, when $P_2$ lags behind a change in $P_1$, a force unbalance is developed across bellows 14. If $P_1$ increases, $P_2$ will also increase, but the increase of $P_2$ will lag behind $P_1$ by a time $T_1$ for the time during which $P_1$ is increasing. Accordingly, a transient force will be developed across bellows 14 urging bellows 14 in an upward direction. This force generated on bellows 14 will be proportional to the rate of change of $P_1$. Referring again to FIGURE 2, the following relationship can be seen:

(1) $$\frac{P_1-P_2}{dP_1}=\frac{T_1}{dt}$$

or (2) $$P_1-P_2=T_1\times\frac{dP_1}{dt}$$

The force generated on bellows 14 is then $A_e(P_1-P_2)$ where $A_e$ is the effective area of bellows 14. If $P_1$ should decrease, $P_2$ will also decrease but lag behind at a time lag $T_1$. In this event, the force generated across bellows 14 would urge bellows 14 downward. In either event, a change in $P_1$ causes a corresponding but lagging change in $P_2$ and results in a force being generated on bellows 14. The force generated on bellows 14 is transmitted through follower 22 to an output lever 24 which has an arm 26. Arm 26 would be connected to a suitable control mechanism such as a control valve.

Output lever 24 is mounted at a pivot 28, and the force transmitted from bellows 14 to output arm 24 imposes a force or torque on arm 24 proportional to the rate of change of $P_1$. The end of lever 24 removed from bellows 14 is pivotably connected via a rod 30 to a pair of opposed bellows 32 and 34. Bellows 32 has a small orifice 36 leading to the interior volume thereof, and bellows 34 has a similar small orifice 38 leading to its interior volume. The orifices 36 and 38 are each very small compared to orifice 20. For effective operation the ratios:

$$\frac{V_{32}/A_{36}}{V_{16}/A_{20}} \text{ and } \frac{V_{34}/A_{38}}{V_{16}/A_{20}}$$

should be at least 10, where:

$V_{32}$=the interior volume of bellows 32
$V_{34}$=the interior volume of bellows 34
$A_{36}$=the effective area of orifice 36
$A_{38}$=the effective area of orifice 38
$V_{16}$=the volume of chamber 16
$A_{26}$=the effective area of orifice 20

During steady state operation when $P_2$ equals $P_1$, the pressures $P_3$ in bellows 32 and $P_4$ in bellows 34 are each equal to $P_2$ and thus equal to $P_1$. The bellows system of bellows 32 and 34 constitutes a pneumatic spring with an effective spring rate proportional to the pressures $P_3$ and $P_4$. The pressures $P_3$ and $P_4$ are equal to $P_1$ in steady state and equalized to any new value of $P_1$ after transients. However, because of the extremely small areas of orifices 36 and 38 the time lag $T_2$ between changes in $P_1$ and changes in $P_3$ and $P_4$ is very long. Thus, the pneumatic spring rate of this pneumatic spring system is essentially proportional to $P_1$. By selecting bellows 32 and 34 to have small mechanical spring rates, the pneumatic spring rate is essentially equal to the total spring rate so that the system of bellows 32 and 34 impose the equivalent of a spring load on output lever 24, the spring load being proportional to the previous steady state value of $P_1$.

By way of example of the operation of the device, assume that $P_1$ increases so that a force is generated loading bellows 14 in the upward direction to impose a clockwise force or torque on lever 24. The right hand end of lever 24 pulls rod 30 downward to expand bellows 32 and compress bellows 34. The air in bellows 32 expands so that $P_3$ is momentarily reduced, and the air in bellows 34 is compressed so that $P_4$ is increased, the changes in volume of bellows 32 and 34 and hence the changes in pressure in these bellows being a function of the pressure $P_1$ originally in the bellows. It will be observed that the expansion of the air in bellows 32 and the compression of the air in bellows 34 take place because the size of orifices 36 and 38 is small enough to inhibit any swift passage of air into or out of the interior of the bellows. The compression of bellows 34 increases $P_4$ while the expansion of bellows 32 decreases $P_3$. $P_4$ reacts with $P_2$ outside of bellows 34 to generate an upward force on rod 30, and $P_2$ on the outside of bellows 32 opposes $P_3$ to also impose an upward force on rod 30. Thus, the expansion of bellows 32 and the compression of bellows 34 creates, in effect, a spring action opposing the original clockwise rotation of lever 24. Conversely, if $P_1$ should decrease, $P_2$ would decrease at a predetermined time lag, and the forces generated across bellows 14 would result in a counterclockwise loading on lever 24. The counterclockwise loading on lever 24 would compress bellows 32 and expand bellows 34 to impose a clockwise spring force on rod 24. Thus, it can be seen that the displacement $\Delta x$ of rod 24 is a function of the loads on lever 24 from bellows 14 and from the spring system of bellows 32 and 34. Since the loading from bellows 14 is proportional to the rate of change of $P_1$, and since the opposed loading from bellows 32 and 34 is proportional to $P_1$, the net displacement $\Delta x$ of output lever 24, and hence arm 26, is proportional to the rate of change of $P_1$ divided by $P_1$ i.e., proportional to the percent rate of change of $P_1$.

In the operation of the device, after $P_1$ has assumed a new steady state level, $P_2$ then achieves that new steady state level after the time lag $T_1$. The force unbalance across bellows 14 is then removed, and lever 24 returns to an equilibrium steady state condition. $P_3$ and $P_4$ then equalize to the new value of $P_1$ after the time lag $T_2$.

While a preferred embodiment has been shown and described, various modifications and substitutions may be made without departing from the spirit and scope of this invention. Accordingly, it is to be understood that this invention has been described by way of illustration rather than limitation.

What is claimed is:

1. A percent rate of change pressure sensor including:
    a casing defining a chamber having a fluid therein, said casing having first and second orifices therein, the area of said first orifice being greater than the area of said second orifice, said second orifice communicating with the fluid in said chamber;
    first pressure responsive means in said chamber communicating with said first orifice and being exposed to the fluid in said chamber;
    means for delivering a pressurized fluid of variable pressure to said first and second orifices to generate a force from said first pressure responsive means proportional to the rate of change of pressure of said pressurized fluid;
    fluid spring means in said chamber for generating a spring rate proportional to the steady state pressure of said pressurized fluid; and
    output means connected to receive force signals from said first pressure responsive means and said fluid spring means to generate a signal commensurate with the percent rate of change of pressure of said pressurized fluid.

2. A percent rate of change pressure sensor as in claim 1 wherein said output means includes lever means extending between said first pressure responsive means and said fluid spring means, said lever means being pivotable about a point between said first pressure responsive means and said fluid spring means.

3. A percent rate of change pressure sensor as in claim 1 wherein said fluid spring means includes second pressure responsive means in said chamber, said second pressure responsive means having an internal volume and orifice means connecting said internal volume to the fluid in said chamber.

4. A percent rate of change pressure sensor as in claim 3 wherein the area of said orifice means connecting said internal volume of said second pressure responsive means to the fluid in said chamber is smaller than the area of said second orfice.

5. A percent rate of change pressure sensor as in claim 3 wherein said second pressure responsive means includes a pair of opposed pressure responsive devices, each of said opposed pressure responsive devices having an internal volume, and wherein said orifice means in said second pressure responsive means includes an orifice in each of said opposed pressure responsive devices.

6. A percent rate of change pressure sensor as in claim 5 wherein the area of each of said orifices in each of said opposed pressure responsive devices is smaller than the area of said second orifice.

7. A percent rate of change pressure sensor as in claim 6 wherein said output means includes lever means extending between said first pressure responsive means and said pair of opposed pressure responsive devices, said lever means being pivotable about a point between said first pressure responsive means and said pair of opposed pressure responsive devices.

8. A percent rate of change pressure sensor including:
a casing defining a chamber having a fluid therein, said casing having first and second orifices therein, the area of said first orifice being greater than the area of said second orifice, said second orifice communicating with the fluid in said chamber;
first bellows means in said chamber, the internal volume of said first bellows means communicating with said first orifice, and the exterior of said first bellows means being exposed to the fluid in said chamber;
means for delivering a pressurized fluid of variable pressure to said first and second orifices to vary both the pressure in said internal volume of said first bellows means and the pressure in said chamber at a time interval to generate a force from said first bellows means proportional to the rate of change of pressure of said pressurized fluid;
second bellows means in said chamber for generating a spring rate proportional to the steady state pressure of said pressurized fluid, said second bellows means having an internal volume and orifice means connecting said internal volume to the fluid in said chamber; and
output means connected to receive force signals from said first and second bellows means to generate a signal commensurate with the percent rate of change of pressure of said pressurized fluid.

9. A percent rate of change pressure sensor as in claim 8 wherein said output means includes lever means extending between said first and second bellows means, said lever means being pivotable about a point between said first and second bellows means.

10. A percent rate of change pressure sensor as in claim 8 wherein the area of said orifice means connecting the internal volume of said second bellows means to the fluid in said chamber is smaller than the area of said second orifice.

11. A percent rate of change pressure sensor as in claim 8 wherein the relationship:

$$\frac{V_{2/A_2}}{V_{1/A_1}}$$

is at least 10, where:

$V_1$ = the internal volume of said first bellows means
$A_1$ = the effective area of said first orifice
$V_2$ = the volume of said chamber
$A_2$ = the effective area of said second orifice 12. A percent rate of change pressure sensor as in claim 8 wherein said second bellows includes a pair of opposed bellows, each of said opposed bellows having an internal volume, and wherein said orifice means in said second bellows means includes an orifice in each of said opposed bellows.

13. A percent rate of change pressure sensor as in claim 12 wherein the area of each of said orifices in each of said opposed bellows is smaller than the area of said second orifice.

14. A percent rate of change pressure sensor as in claim 13 wherein said output means includes lever means extending between said first bellows means and said pair of opposed bellows, said lever means being pivotable about a point between said first bellows means and said pair of opposed bellows.

15. A percent rate of change pressure sensor as in claim 12 wherein each of the relationships:

$$\frac{V_{3/A_3}}{V_{2/A_2}} \quad \text{and} \quad \frac{V_{4/A_4}}{V_{2/A_2}}$$

is at least 10, where:

$V_2$ = the volume of said chamber
$A_2$ = the effective area of said second orifice
$V_3$ = the internal volume of one of said pair of opposed bellows
$A_3$ = the effective area of the orifice in said one of opposed bellows
$V_4$ = the internal volume of the other of said pair of opposed bellows
$A_4$ = the effective area of the orifice in said other of the opposed bellows.

No references cited.

LOUIS R. PRINCE, *Primary Examiner.*

DONALD O. WOODIEL, *Assistant Examiner.*